United States Patent
Jackson et al.

(10) Patent No.: US 12,380,156 B2
(45) Date of Patent: *Aug. 5, 2025

(54) METHODS AND SYSTEMS FOR AUTOMATICALLY CLASSIFYING REALITY CAPTURE DATA

(71) Applicant: DroneDeploy, Inc., Santa Clara, CA (US)

(72) Inventors: Jay Nicholas Jackson, Noblesville, IN (US); Cody James Cahoon, Cary, NC (US)

(73) Assignee: DroneDeploy, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/734,841

(22) Filed: Jun. 5, 2024

(65) Prior Publication Data

US 2024/0320260 A1   Sep. 26, 2024

Related U.S. Application Data

(63) Continuation of application No. 17/869,233, filed on Jul. 20, 2022, now Pat. No. 12,032,622.

(51) Int. Cl.
*G06F 16/45* (2019.01)

(52) U.S. Cl.
CPC .................................. *G06F 16/45* (2019.01)

(58) Field of Classification Search
CPC ..................................................... G06F 16/45
See application file for complete search history.

(56) References Cited

U.S. PATENT DOCUMENTS

2012/0274846 A1* 11/2012 Kimura ............... G06T 11/60
                                                         348/E7.003
2018/0365898 A1* 12/2018 Costa .................. G06F 3/012
(Continued)

OTHER PUBLICATIONS

A.Dhanda et al., A Metadata Based Approach for Analyzing UAV Datasets for Photogrammetric Applications, The International Archives of the Photogrammetry, Remote Sensing and Spatial Information Sciences, vol. XLII-2, 2018 ISPRS TC II Mid-term Symposium "Towards Photogrammetry 2020", Jun. 4-7, 2018, Riva del Garcia, Italy.

(Continued)

*Primary Examiner* — Jared M Bibbee
(74) *Attorney, Agent, or Firm* — Bookoff McAndrews, PLLC (57) ABSTRACT

A method for classifying a set of source files of reality capture data into an asset class of digital reality capture assets may include receiving, from a user device, a set of payloads including metadata of the set of source files of the reality capture data corresponding to a region of interest captured by a camera. The method may include classifying the set of source files of the reality capture data into the asset class of the digital reality capture assets, based on the set of payloads including the metadata of the set of source files of the reality capture data. The method may include providing, to the user device, information identifying the asset class of the digital reality capture assets to which the set of source files are classified to permit a digital reality capture asset, corresponding to the asset class, of the region of interest to be generated based on the set of source files.

17 Claims, 10 Drawing Sheets

(56) References Cited

U.S. PATENT DOCUMENTS

| | | | | |
|---|---|---|---|---|
| 2020/0104585 A1* | 4/2020 | Collinson | ............... | G06F 16/34 |
| 2020/0184706 A1* | 6/2020 | Speasl | ................... | H04L 9/0643 |
| 2021/0166376 A1* | 6/2021 | Hernandez | ............. | B64U 10/14 |
| 2021/0221506 A1* | 7/2021 | Phelan | ................... | G01S 13/951 |
| 2023/0131370 A1* | 4/2023 | Gorski | ................. | A01K 29/005 |
| | | | | 340/573.1 |
| 2023/0188577 A1* | 6/2023 | Venkiteswaran | ..... | G06F 16/904 |
| | | | | 709/204 |
| 2023/0306674 A1* | 9/2023 | Speasl | ................... | G06Q 50/163 |
| 2023/0312091 A1* | 10/2023 | Shoeb | ................... | G08G 5/0052 |
| | | | | 701/8 |
| 2023/0316739 A1* | 10/2023 | Shoeb | ...................... | G06T 7/70 |
| | | | | 382/104 |

OTHER PUBLICATIONS

Intenational Search Report and Written Opinion of the ISA, dated Oct. 13, 2023, for application No. PCT/US2023/070513.

\* cited by examiner

METHODS AND SYSTEMS FOR AUTOMATICALLY CLASSIFYING REALITY CAPTURE DATA

CROSS-REFERENCE TO RELATED APPLICATION

This application is a continuation of and claims the benefit of priority to U.S. application Ser. No. 17/869,233, filed on Jul. 20, 2022, which is incorporated herein by reference in its entirety.

TECHNICAL FIELD

The present disclosure relates to methods and systems for automatically classifying source files of reality capture data into an asset class of digital reality capture assets. More specifically, the present disclosure relates to methods and systems for automatically classifying source files of reality capture data into an asset class of digital reality capture assets based on metadata of the source files of the reality capture data.

BACKGROUND

An entity may obtain reality capture data of a region of interest using a particular camera, and generate a digital reality capture asset based on source files of the reality capture data. For example, an entity may capture orthophotos of a structure using a camera of an unmanned aerial vehicle (UAV), and generate an orthomosaic of the structure based on the orthophotos. As another example, the entity may capture walkthrough photos of the structure using a specialized camera, and generate a walkthrough of the structure based on the walkthrough photos. As yet another example, the entity may capture thermal images of the structure using a thermal camera, and generate a thermogram based on the thermal images. The entity may then view the digital reality capture assets to assess the structure, service the structure, display the structure, etc.

To generate a digital reality capture asset, the entity might be required to manually classify the source files of the reality capture data into an appropriate asset class of digital reality capture assets. For example, the entity might be required to classify constituent source files of an orthomosaic as belonging to the asset class of "orthomosaic." Further, the entity might be required to classify each source file of reality capture data into an appropriate asset class. In some cases, the entity might have myriad source files to classify. Accordingly, manually classifying the source files of the reality capture data into an appropriate asset class of digital reality capture assets might be impossible, impractical, inefficient, or error-prone. Moreover, an incorrectly classified source file may degrade processing of the digital reality capture asset, thereby consuming computational resources and network resources.

As such, a need exists for a technique to automatically and accurately classify source files of reality capture data into an asset class of digital reality capture assets.

SUMMARY

According to an embodiment of the present disclosure, a method for classifying a set of source files of reality capture data into an asset class of digital reality capture assets may include receiving, from a user device, a set of payloads including metadata of the set of source files of the reality capture data corresponding to a region of interest captured by a camera; classifying the set of source files of the reality capture data into the asset class of the digital reality capture assets, based on the set of payloads including the metadata of the set of source files of the reality capture data; and providing, to the user device, information identifying the asset class of the digital reality capture assets to which the set of source files are classified to permit a digital reality capture asset, corresponding to the asset class, of the region of interest to be generated based on the set of source files.

According to an embodiment of the present disclosure, a device for classifying a set of source files of reality capture data into an asset class of digital reality capture assets may include a memory configured to store instructions; and a processor configured to execute the instructions to perform operations comprising: receiving, from a user device, a set of payloads including metadata of the set of source files of the reality capture data corresponding to a region of interest captured by a camera; classifying the set of source files of the reality capture data into the asset class of the digital reality capture assets, based on the set of payloads including the metadata of the set of source files of the reality capture data; and providing, to the user device, information identifying the asset class of the digital reality capture assets to which the set of source files are classified to permit a digital reality capture asset, corresponding to the asset class, of the region of interest to be generated based on the set of source files.

According to an embodiment of the present disclosure, a non-transitory computer-readable medium may store instructions that, when executed by a processor for classifying a set of source files of reality capture data into an asset class of digital reality capture assets, cause the processor to perform operations comprising: receiving, from a user device, a set of payloads including metadata of the set of source files of the reality capture data corresponding to a region of interest captured by a camera; classifying the set of source files of the reality capture data into the asset class of the digital reality capture assets, based on the set of payloads including the metadata of the set of source files of the reality capture data; and providing, to the user device, information identifying the asset class of the digital reality capture assets to which the set of source files are classified to permit a digital reality capture asset, corresponding to the asset class, of the region of interest to be generated based on the set of source files.

It may be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

DETAILED DESCRIPTION

As addressed above, manually classifying source files of reality capture data into an asset class might be impossible, impractical, or error-prone. Moreover, incorrectly classified source files might degrade processing of digital reality capture assets.

To address the foregoing, the present disclosure provides methods and systems for automatically classifying source files of reality capture data into an asset class of digital reality capture assets. In this way, the present disclosure provides a technical improvement in classifying source files and generating corresponding digital reality capture assets by permitting classification of source files in situations where it is otherwise impossible or at least impractical to do so, by more accurately classifying source files, by more efficiently classifying source files, and by more quickly classifying source files. Moreover, the present disclosure provides methods and systems for classifying source files of reality capture data into an asset class of digital reality capture assets using metadata of the source files instead of the entirety of the source files. In this way, the present disclosure provides a technical improvement in classifying source files and generating corresponding digital reality capture assets by reducing an amount of data that is transmitted via a network, and by reducing the amount of data that is processed.

Figure 1:
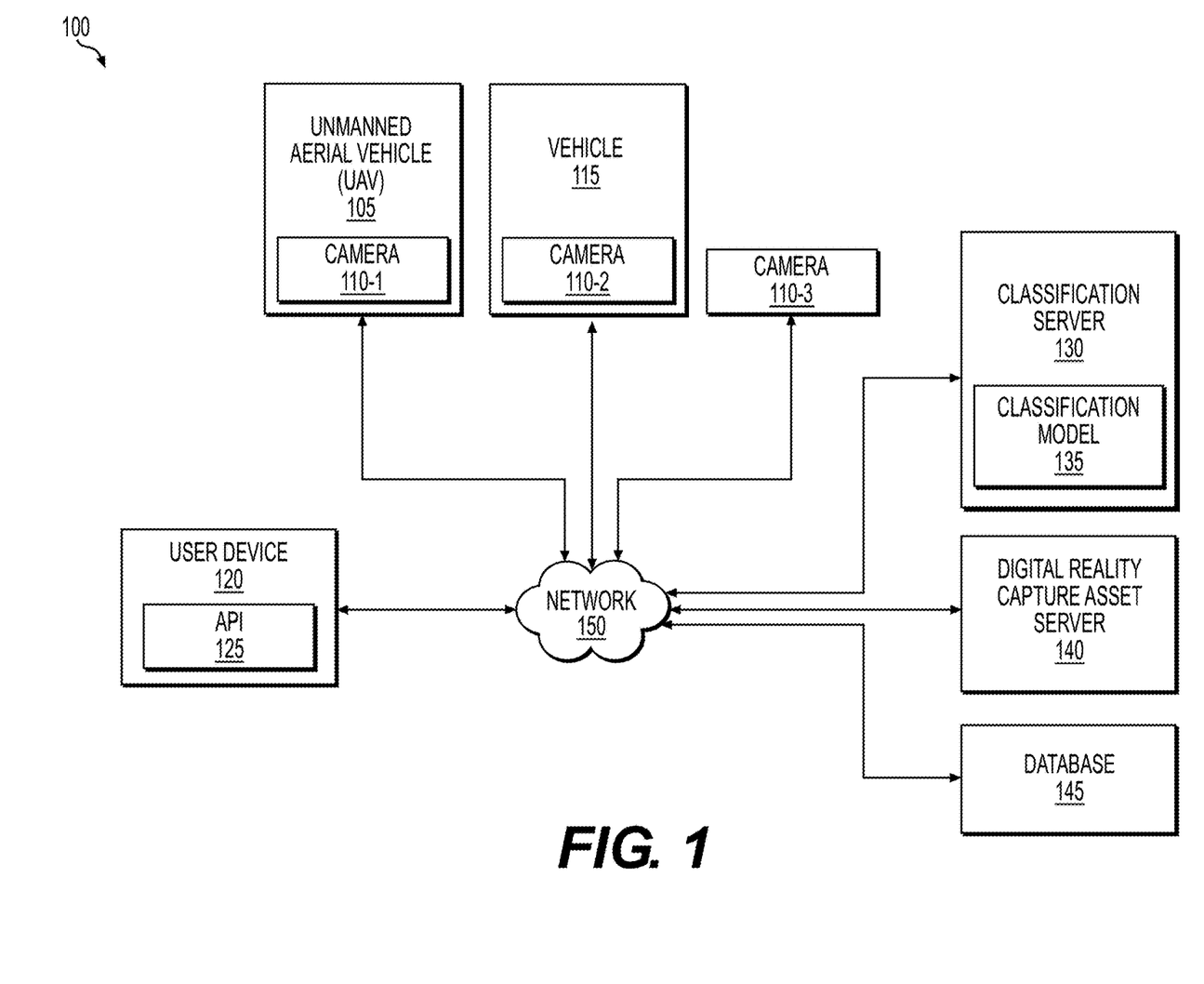
FIG. 1 is a diagram of an example system 100 for classifying a set of source files of reality capture data into an asset class of digital reality capture assets.

FIG. 1 is a diagram of an example system 100 for classifying a set of source files of reality capture data into an asset class of digital reality capture assets. As shown in FIG. 1, the system 100 may include an unmanned aerial vehicle (UAV) 105, a camera 110-1, a camera 110-2, a camera 110-3, a vehicle 115, a user device 120, an application programming interface (API) 125, a classification server 130, a classification model 135, a digital reality capture asset server 140, a database 145, and a network 150.

The UAV 105 (or "drone") may include a device configured to fly above, around, within, etc., a region of interest. For example, the UAV 105 may be a multi-rotor drone, a fixed-wing drone, a single-rotor drone, a vertical take-off and landing (VTOL) drone, a satellite, or the like.

The camera 110-1, the camera 110-2, and/or the camera 110-3 may be a device configured to capture reality capture data of a region of interest. For example, the camera 110-1, the camera 110-2, and/or the camera 110-3 may be a digital camera, a thermal camera, a hyperspectral camera, or the like.

The vehicle 115 may be a device configured to move around, within, etc., the region of interest. For example, the vehicle 115 may be a car, an autonomous vehicle, a robot, a train, a plane, a helicopter, or the like.

The user device 120 may be a device configured to receive a set of source files of reality capture data corresponding to a region of interest captured by the camera 110-1, the camera 110-2, and/or the camera 110-3, generate a set of payloads including metadata of the set of source files, and provide the set of payloads to the classification server 130. For example, the user device 120 may be a smartphone, a laptop computer, a desktop computer, a server, or the like.

The API 125 may be an interface that permits the user device 120 and the classification server 130 to communicate. For example, the user device 120 may provide a set of payloads to the classification server 130 via the API 125, and may receive information identifying an asset class of digital reality capture assets to which a set of source files, corresponding to the set of payloads, are classified via the API 125.

The classification server 130 may include a device configured to classify a set of source files of reality capture data into an asset class of digital reality capture assets. For example, the classification server 130 may be a server, a cloud server, a virtual machine, or the like.

The classification model 135 may include a model configured to receive a set of payloads as an input, classify a set of source files, corresponding to the set of payloads, into an asset class of digital reality capture assets, and provide information identifying the asset class as an output. For example, the classification model 135 may be a neural network, a decision tree, a support-vector machine, a Bayesian network, or the like.

The digital reality capture asset server 140 may be a device configured to generate a digital reality capture asset, and/or provide the digital reality capture asset to the user device 120 for display. For example, the digital reality capture asset server 140 may be a server, a cloud server, a virtual machine, or the like.

The database 145 may include a device configured to store source files, payloads, digital reality capture assets, and/or the like. For example, the database 145 may be a centralized database, a distributed database, a cloud database, a network database, a hierarchical database, or the like.

The network 150 may be a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of the devices of the system 100 shown in FIG. 1 are provided as an example. In practice, the system 100 may include additional devices, fewer devices, different devices, or differently arranged devices than those shown in FIG. 1. Additionally, or alternatively, a set of devices (e.g., one or more devices) of the system 100 may perform one or more functions described as being performed by another set of devices of the system 100.

Figure 2:
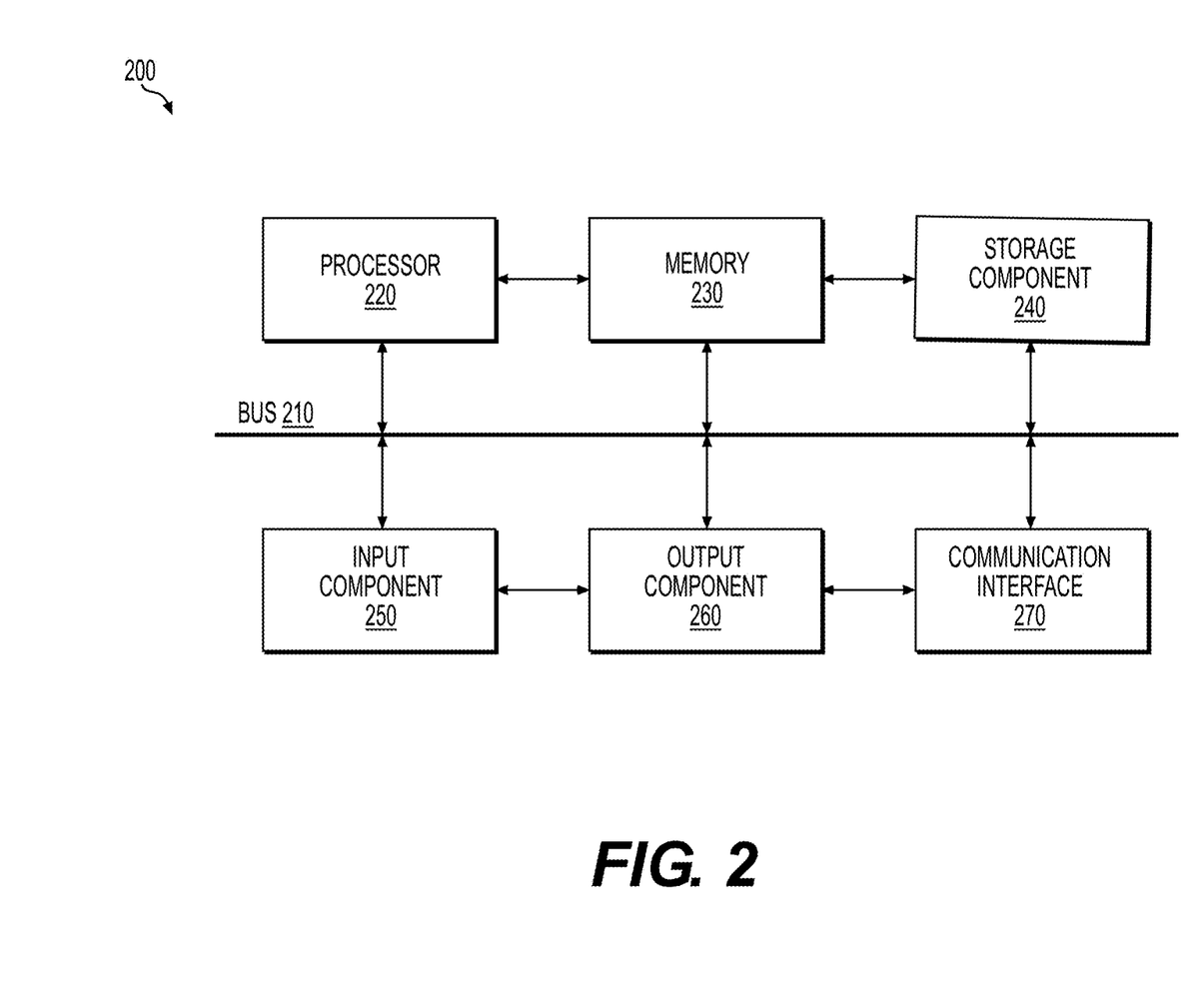
FIG. 2 is a diagram of example components of a device 200 for classifying a set of source files of reality capture data into an asset class of digital reality capture assets.

FIG. 2 is a diagram of example components of a device 200. The device 200 may correspond to the UAV 105, the camera 110-1, the camera 110-2, the camera 110-3, the vehicle 115, the user device 120, the classification server 130, the digital reality capture asset server 140, and/or the database 145. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 may be implemented in hardware, firmware, or a combination of hardware and software. The processor 220 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component.

The processor 220 may include one or more processors capable of being programmed to perform a function. The memory 230 may include a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 may store information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 may include a component that permits the device 200 to receive information, such as via user input (e.g., a touch screen display, a keyboard, a keypad, a mouse, a button, a switch, and/or a microphone for receiving the reference sound input). Additionally, or alternatively, the input component 250 may include a sensor for sensing information (e.g., a global positioning system (GPS) component, an accelerometer, a gyroscope, and/or an actuator). The output component 260 may include a component that provides output information from the device 200 (e.g., a display, a speaker for outputting sound at the output sound level, and/or one or more light-emitting diodes (LEDs)).

The communication interface 270 may include a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes based on the processor 220 executing software instructions stored by a non-transitory computer-readable medium, such as the memory 230 and/or the storage component 240. A computer-readable medium may be defined herein as a non-transitory memory device. A memory device may include memory space within a single physical storage device or memory space spread across multiple physical storage devices.

The software instructions may be read into the memory 230 and/or the storage component 240 from another computer-readable medium or from another device via the communication interface 270. When executed, the software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of the components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

Figure 3:
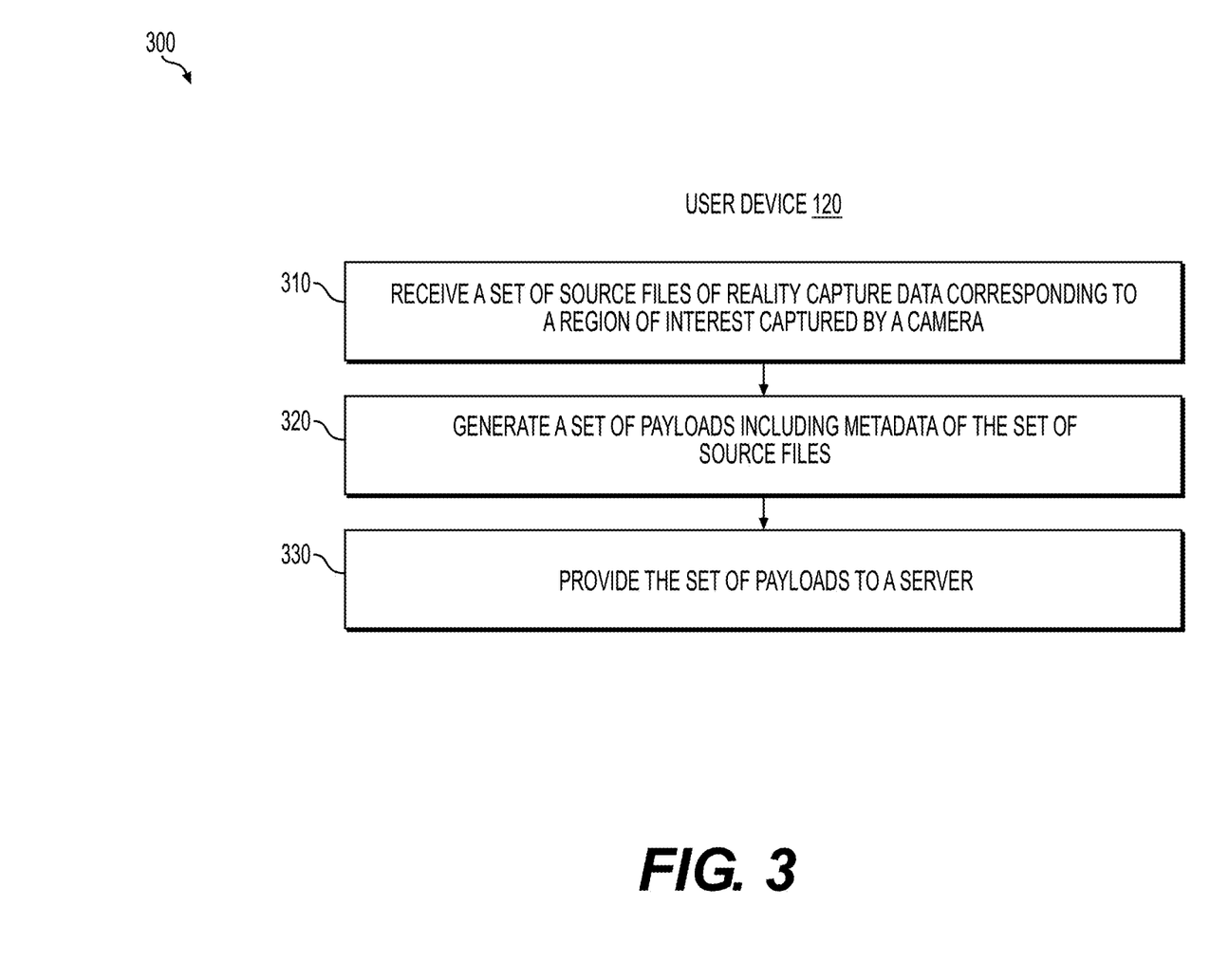
FIG. 3 is a flowchart of an example process 300 for generating a set of payloads.

FIG. 3 is a flowchart of an example process 300 for generating a set of payloads. The process 300 may be performed by the user device 120 prior to transmitting the generated payload to a server, e.g., the classification server 130.

As shown in FIG. 3, the process 300 may include receiving a set of source files of reality capture data corresponding to a region of interest captured by a camera (operation 310).

The region of interest may be any type of region that is capable of being captured via the camera 110-1, the camera 110-2, and/or the camera 110-3. For example, the region of interest may be a building, a house, a structure, a field of crop, a pipeline, a natural object, a roadway, etc.

The reality capture data may be data that is generated by the camera 110-1, the camera 110-2, and/or the camera 110-3, and may correspond to the region of interest. For example, the reality capture data may be image data or video data of the region of interest.

The UAV 105 may obtain reality capture data corresponding to a region of interest via the camera 110-1. For example, the UAV 105 may fly over the region of interest, and the camera 110-1 may capture reality capture data corresponding to the region of interest. Alternatively, the vehicle 115 may obtain reality capture data corresponding to a region of interest via the camera 110-2. For example, the vehicle 115 may drive past the region of interest, and the camera 110-2 may capture reality capture data corresponding to the region of interest. Alternatively, the camera 110-3 may capture data corresponding to a region of interest. For example, a person may manipulate the camera 110-3 inside or outside of the region of interest to capture reality capture data corresponding to the region of interest.

The camera 110-1, the camera 110-2, and/or the camera 110-3 may generate source files corresponding to the reality capture data. For example, the source files may include the reality capture data generated by the camera 110-1, the camera 110-2, and/or the camera 110-3.

Figure 4A:
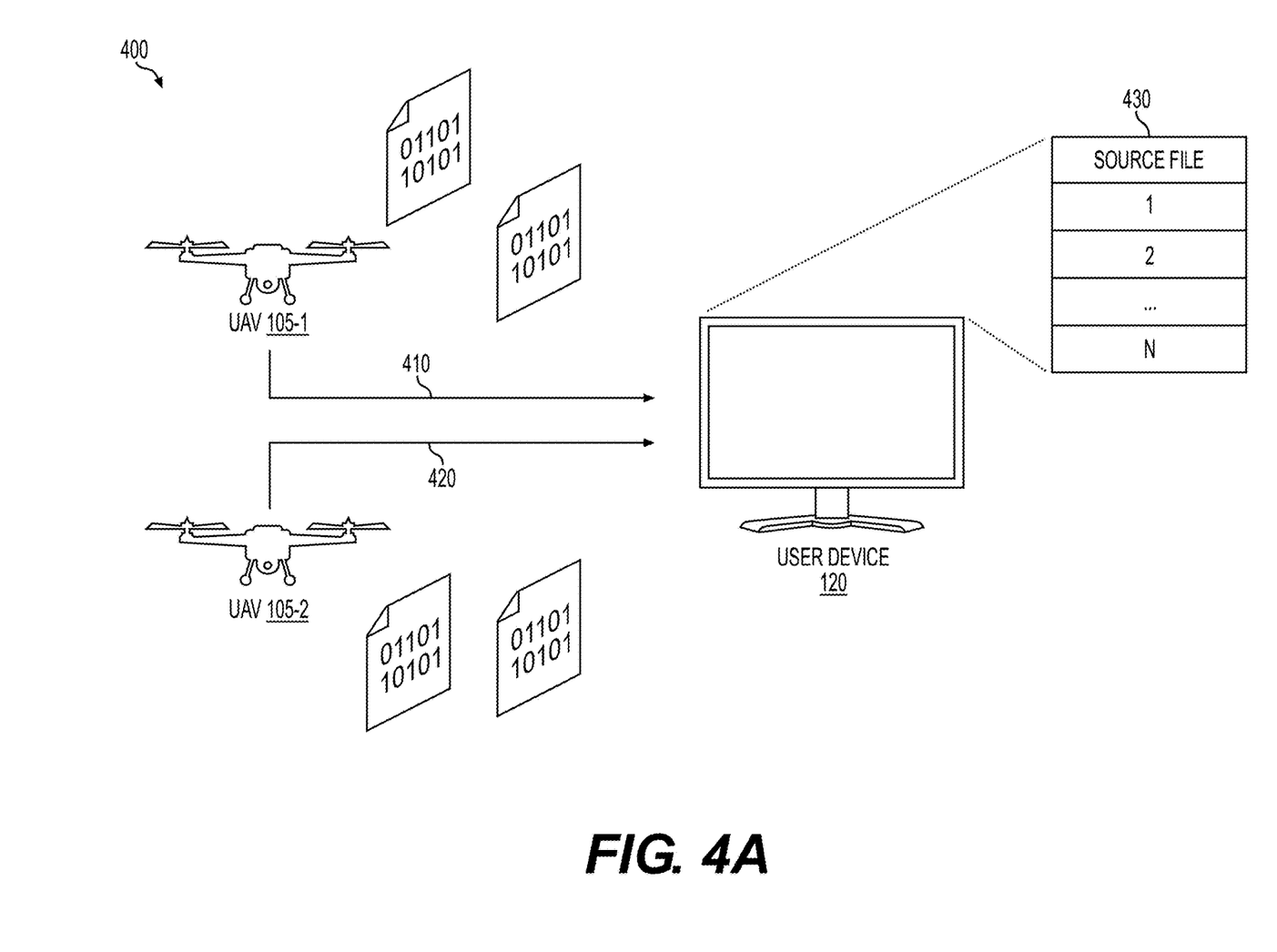
FIGS. 4A-4C are diagrams of an example system 400 for generating a set of payloads.

The camera 110-1, the camera 110-2, and/or the camera 110-3 may provide the source files to the user device 120, and the user device 120 may receive the set of source files. As an example, and as shown by reference number 410 in FIG. 4A, a UAV 105-1 may provide source files to the user device 120. Further, as shown by reference number 420, a UAV 105-2 may provide source files to the user device 120. Alternatively, the camera 110-1, the camera 110-2, and/or the camera 110-3 may provide the source files to the database 145, and the user device 120 may receive the source files based on accessing the database 145.

The user device 120 may receive the set of source files based on the source files being generated. For example, the UAV 105 may perform a flight around a region of interest, and the camera 110-1 of the UAV 105 may generate source files as the UAV 105 flies around the region of interest. The UAV 105 may provide the source files substantially concurrently with, or within a threshold time frame with, the generation of the source files.

Alternatively, the user device 120 may receive the set of source files from the database 145. For example, the source files may be stored in the database 145, and the user device 120 may access the database 145 to request and receive the source files.

In some cases, the source files may correspond to a single region of interest, and may correspond to a single digital reality capture asset to be generated. For example, the source files may be constituent source files of an orthomosaic of a region of interest. In this case, one or more UAVs 105 may capture reality capture data of the region of interest, and generate source files corresponding to the region of interest.

Alternatively, the source files may correspond to a single region of interest, and may correspond to multiple digital reality capture assets, of a same class, to be generated. For example, a first subset of the source files may be constituent source files of a first orthomosaic of the region of interest, and a second subset of the source files may be constituent source files of a second orthomosaic of the region of interest.

Alternatively, the source files may correspond to a single region of interest, and may correspond to multiple digital reality capture assets, of different classes, to be generated. For example, a first subset of the source files may be constituent source files of an orthomosaic of the region of interest, and a second subset of the source files may be constituent source files of a walkthrough of the region of interest.

Alternatively, the source files may correspond to different regions of interest, and/or may correspond to different digital reality capture assets to be generated. For example, a first subset of the source files may be constituent source files of an orthomosaic of a first region of interest, and a second subset of the source files may be constituent source files of a panorama of a second region of interest.

When the source files are generated by the camera 110 and/or when the source files are obtained by the user device 120, the source files might not be classified into an asset class of digital reality capture assets. That is, the source files might not include metadata identifying a digital reality capture asset to which the source files belong. A digital reality capture asset may be a panorama, a walkthrough, a progress photo, a progress video, a raw file, a pre-processed panorama, an orthomosaic, a thermal capture, a multi-spectral image, a slant range image, a façade capture, etc. An asset class may refer to a type of digital reality capture asset. For example, orthomosaics may belong to a first asset class, walkthroughs may belong to a second asset class, etc.

To generate a digital reality capture asset using the source files, the source files might need to be classified into an appropriate asset class of digital reality capture assets. For example, constituent source files of an orthomosaic might need to each be classified into an asset class of "orthomosaic." Metadata indicating the asset class of the source files might need to be generated. In this way, the digital reality capture asset server 140 may generate the particular type of digital capture reality asset based on the asset class to which the source files are classified.

As further shown in FIG. 3, the process 300 may include generating a set of payloads including metadata of the set of source files (operation 320).

Each of the source files may include various metadata. For example, the metadata may include a latitude, a longitude, an altitude, a time stamp, an identifier of the camera 110, an identifier of the UAV 105, an identifier of the vehicle 115, a number of pixels, a pixel height, a pixel width, an aspect ratio, a file type, a flight identifier, a job identifier, a region of interest identifier, an entity identifier, an operator identifier, a user identifier, a customer identifier, or the like.

A payload may refer to a data structure that includes a set of metadata of a source file. For example, a payload may include a source file identifier, a payload identifier, and values for the set of metadata. The set of metadata may be predefined, and may include all of, or a subset of, the metadata of the source file. For example, as shown by reference number 440 in FIG. 4B, the user device 120 may generate n payloads that each include a source file identifier field, a payload identifier field, and metadata fields (e.g., metadata 1, metadata 2, ..., metadata m).

Figure 4B:
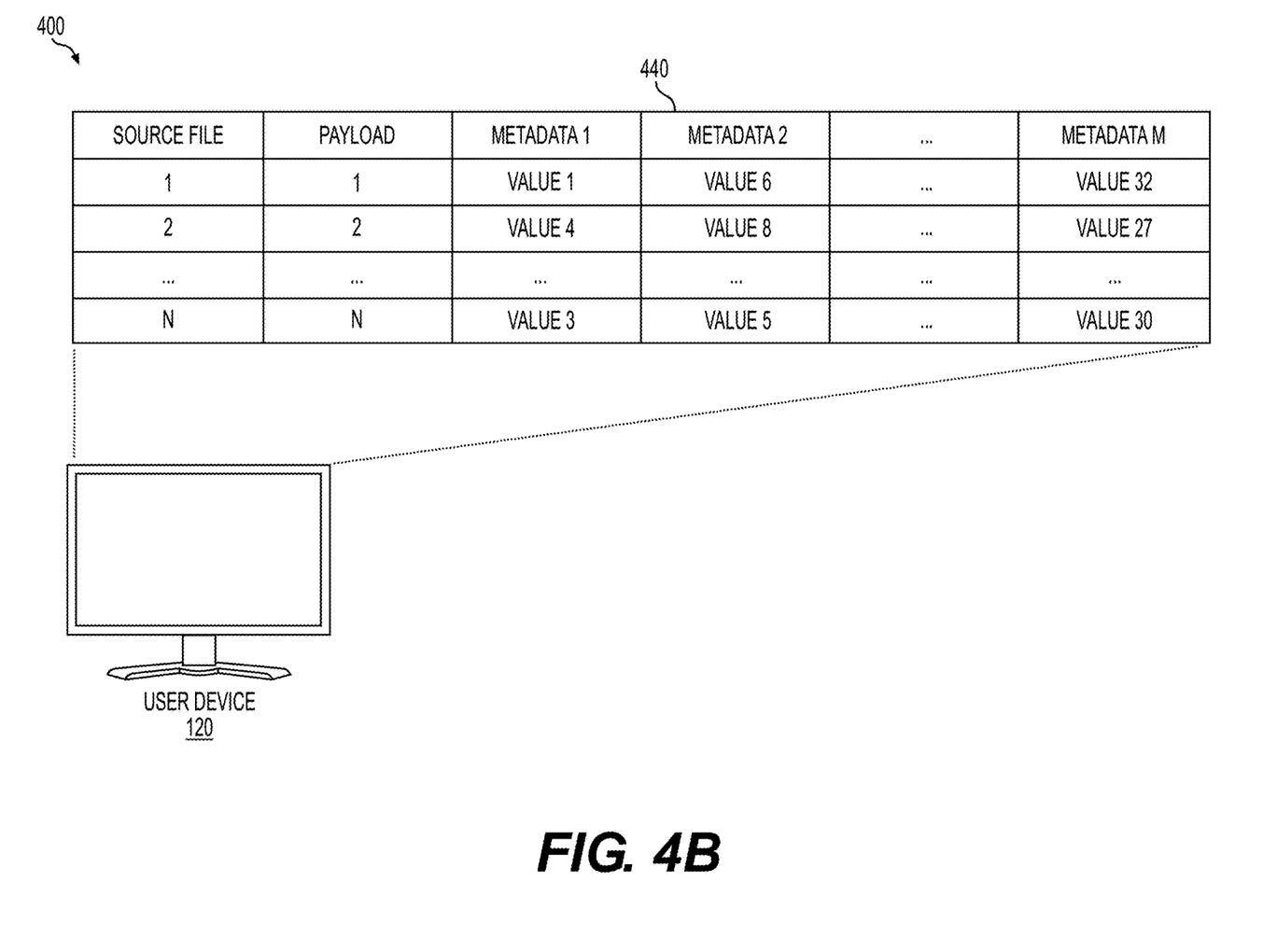

In some cases, the source field identifier and the payload identifier may be the same. Alternatively, the source field identifier and payload identifier may be different. In any event, the user device 120 may store mapping information that maps a source file identifier to a payload identifier. In some cases, a payload may only include a payload identifier, instead of including both a source file identifier and a payload identifier.

The set of metadata may be predefined. Further, the set of metadata may be customized based on a user input via the user device 120, based on an instruction from the classification server 130, based on an update, or the like. In this way, the set of metadata can be scaled such that more, or less, metadata is included in a payload in order to perform classification. In any event, the set of metadata may be configured such that the classification server 130 is capable of classifying the source files into an asset class based on the set of metadata, as described in more detail elsewhere.

The payload may include less data than as compared to the source file. For example, the size of the payload may be smaller than that of the source file. In this way, the embodiments of the present disclosure conserve network resources by submitting a subset of data of the source file to the classification server 130.

As further shown in FIG. 3, the process 300 may include providing the set of payloads to a server (operation 330).

Figure 4C:
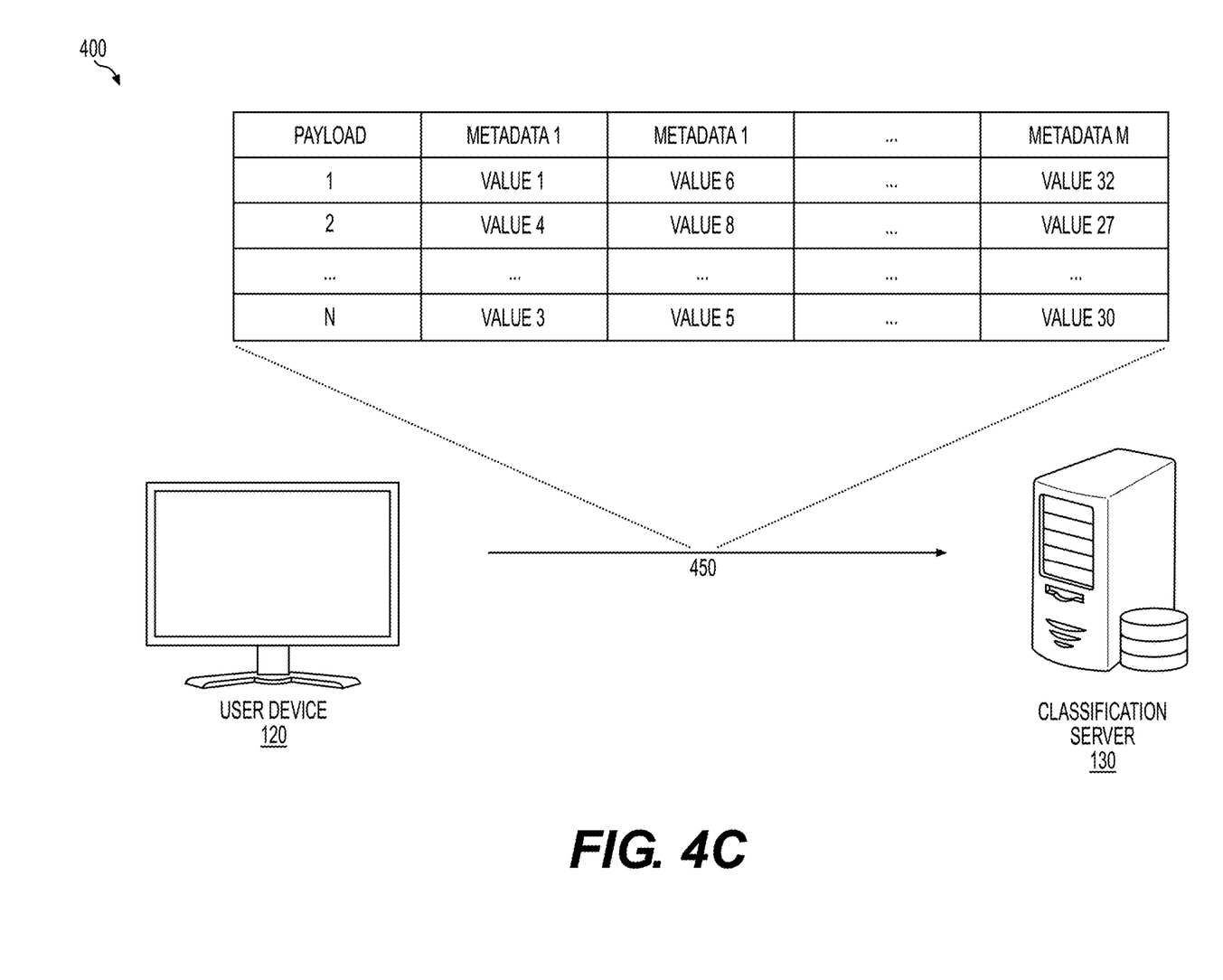

The user device 120 may provide the set of payloads to the classification server 130 to permit the classification server 130 to classify the set of source files, corresponding to the set of payloads, into an asset class of digital reality capture assets. For example, as shown by reference number 450 in FIG. 4C, the user device 120 may provide the set of payloads to the classification server 130.

Figure 5:
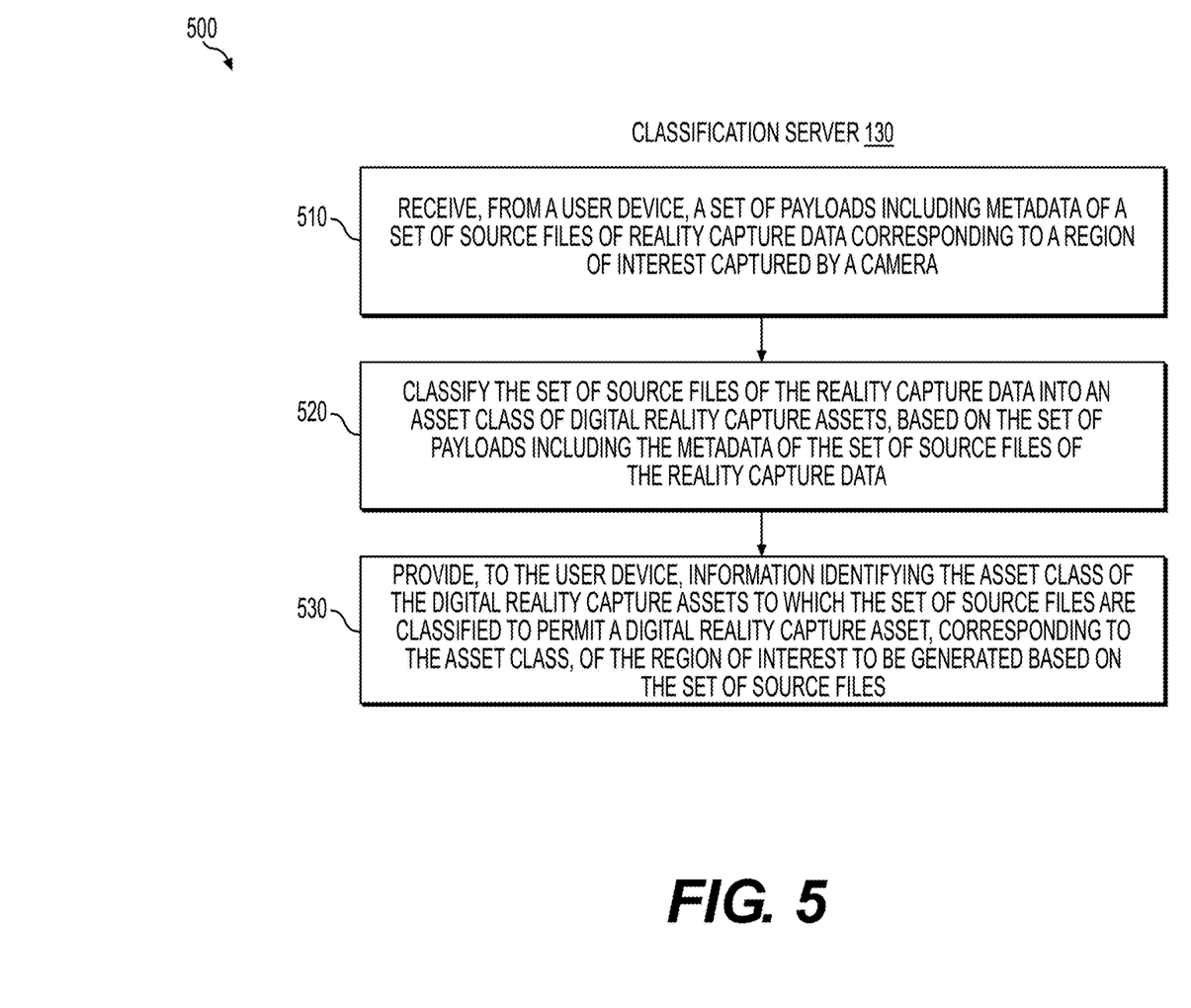
FIG. 5 is a flowchart of an example process 500 for classifying a set of source files of reality capture data into an asset class of digital reality capture assets.

FIG. 5 is a flowchart of an example process 500 for classifying a set of source files of reality capture data into an asset class of digital reality capture assets.

As shown in FIG. 5, the process 500 may include receiving, from a user device, a set of payloads including metadata of a set of source files of reality capture data corresponding to a region of interest (operation 510).

The classification server 130 may receive a set of payloads from the user device 120, as described above in connection with operation 330 of FIG. 3.

As further shown in FIG. 5, the process 500 may include classifying the set of source files of the reality capture data into an asset class of digital reality capture assets, based on the set of payloads including the metadata of the set of source files of the reality capture data (operation 520).

The classification server 130 may classify each source file, of the set of source files, into an asset class of digital reality capture assets. For example, the classification server 130 may classify a source file as belonging to the asset class of "orthomosaic," "walkthrough," "panorama," etc.

The classification server 130 may input the payloads into the classification model 135, and classify the payloads based on an output of the classification model 135. For example, as shown by reference number 610 of FIG. 6A, the classification server 130 may input a set of payloads into the classification model 135. Further, as shown by reference number 620, the classification server 130 may classify the payloads based on an output of the classification model 135. For example, the classification server 130 may classify a first payload ("payload 1") into a first asset class ("asset class A"), classify a second payload ("payload 2") into a second asset class ("asset class C"), and classify a third payload ("payload 3") into a third asset class ("asset class D"). As a particular example, "asset class A" may be an orthomosaic, "asset class B" may be a walkthrough, and "asset class D" may be a panorama. Therefore, the set of payloads input to the classification model 135 may be classified into one or more asset classes.

Figure 6A:
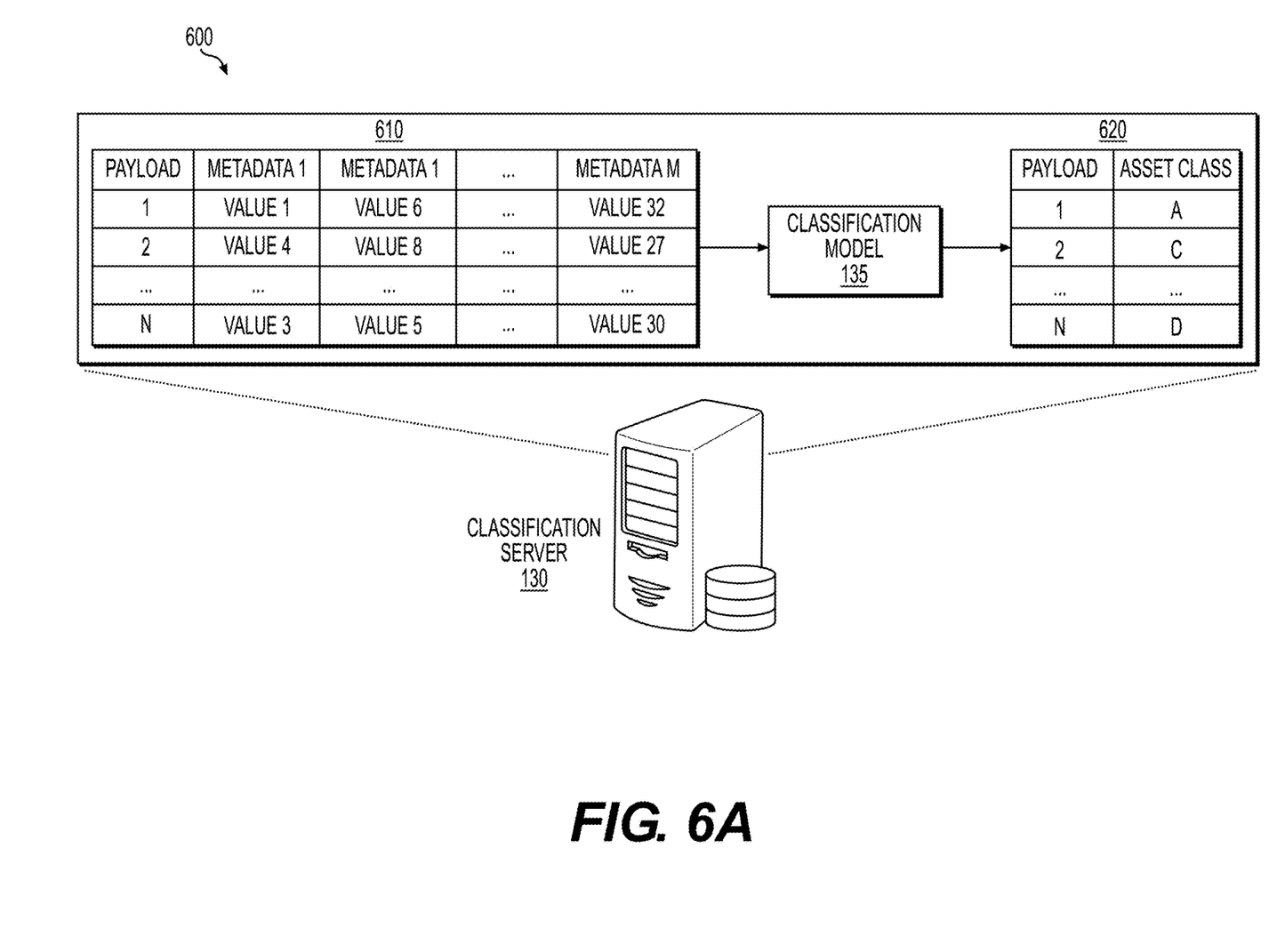
FIGS. 6A-6C are diagrams of an example system 600 for classifying a set of source files of reality capture data into an asset class of digital reality capture assets.

The classification server 130, using the classification model 135, may cluster payloads into clusters, classify the payloads based on clustering the payloads into the clusters, and validate the classified payloads based on classifying the payloads. The classification server 130 may cluster, classify, and validate the payloads based on one or more schemas. A schema may define a particular set of metadata, a particular set of values of the metadata, a particular relationship between values of the metadata, particular thresholds, etc., that are used to cluster, classify, and/or validate the payloads.

The classification server 130 may cluster, using a schema, payloads into clusters of a same asset class and of a same digital reality capture asset to be generated. For example, the classification server 130 may cluster payloads that likely belong to a same asset class (e.g., orthomosaic), and that likely belong to a same particular digital reality capture asset to be generated (e.g., an orthomosaic of a region of interest that was captured by a particular set of UAVs 105).

The classification server 130 may cluster, using the schema, the payloads based on all of, or a subset of, the metadata included in the payloads. Moreover, the classification server 130 may cluster the payloads based on any permutation or combination of metadata included in the payloads. For example, the classification server 130 may cluster the payloads based on a file type, a latitude, a longitude, an altitude, a time stamp, an identifier of the camera 110, an identifier of the UAV 105, an identifier of the vehicle 115, a number of pixels, a pixel height, a pixel width, an aspect ratio, a flight identifier, a job identifier, a region of interest identifier, an entity identifier, an operator identifier, a user identifier, and/or a customer identifier, etc.

As an example, the classification server 130 may cluster payloads that are of a same file type, and that have time stamps within a particular time frame as likely belonging to the same asset class and the same digital reality capture asset to be generated.

The classification server 130 may perform one or more iterations of clustering using various metadata of the payloads. For instance, the classification server 130 may first cluster the payloads based on file type. After clustering the payloads based on file type, the classification server 130 may then further cluster, or refine the clusters, based on one more permutations of metadata. In this way, the classification server 130 may iteratively reduce the number of payloads that are analyzed when clustering the payloads.

The classification server 130 may classify the payloads based on clustering the payloads. For example, the classification server 130 may classify, using a schema, the payloads based on all of, or a subset of, the metadata of the payloads included in the cluster. As an example, the classification server 130 may classify a first set of payloads into a first asset class based on the payloads having a particular set of values of metadata, a particular relationship between values of metadata, values of metadata satisfying particular thresholds, etc. For example, the classification server 130 may classify a set of payloads each having a same file type, time stamps within a particular time frame, and geolocations within a threshold distance of each other, etc., as belonging to a same asset class and a same digital reality capture asset to be generated.

The classification server 130 may validate, using a schema, the classified payloads based on classifying the payloads. For example, the classification server 130 may determine that the classified payloads have a particular set of values of metadata, a particular relationship between values of metadata, values of metadata satisfying particular thresholds, etc., that are consistent with, or that confirm with, the asset class. For example, the classification server 130 may validate that a set of payloads each have a same file type, time stamps within a particular time frame, and geolocations within a threshold distance of each other, etc., as belonging to a same asset class and a same digital reality capture asset to be generated.

As further shown in FIG. 5, the process 500 may include providing, to the user device, information identifying the asset class of the digital reality capture assets to which the set of source files are classified to permit a digital reality capture asset, corresponding to the asset class, of the region of interest to be generated based on the set of source files (operation 530).

The classification server 130 may generate information identifying the asset class of the digital reality capture assets to which the set of source files are classified based on classifying the set of source files. For example, the information identifying the asset class may be information that maps a payload, and/or a source file corresponding to the payload, to an asset class.

The classification server 130 may provide the information identifying the asset class of the digital reality capture assets to which the set of source files are classified to the user device 120. For example, as shown by reference number 630 of FIG. 6B, the classification server 130 may provide the information identifying the asset classes ("A," "C," and "D") to which the source files ("payload 1," "payload 2," and "payload 3") are respectively classified.

Figure 6B:
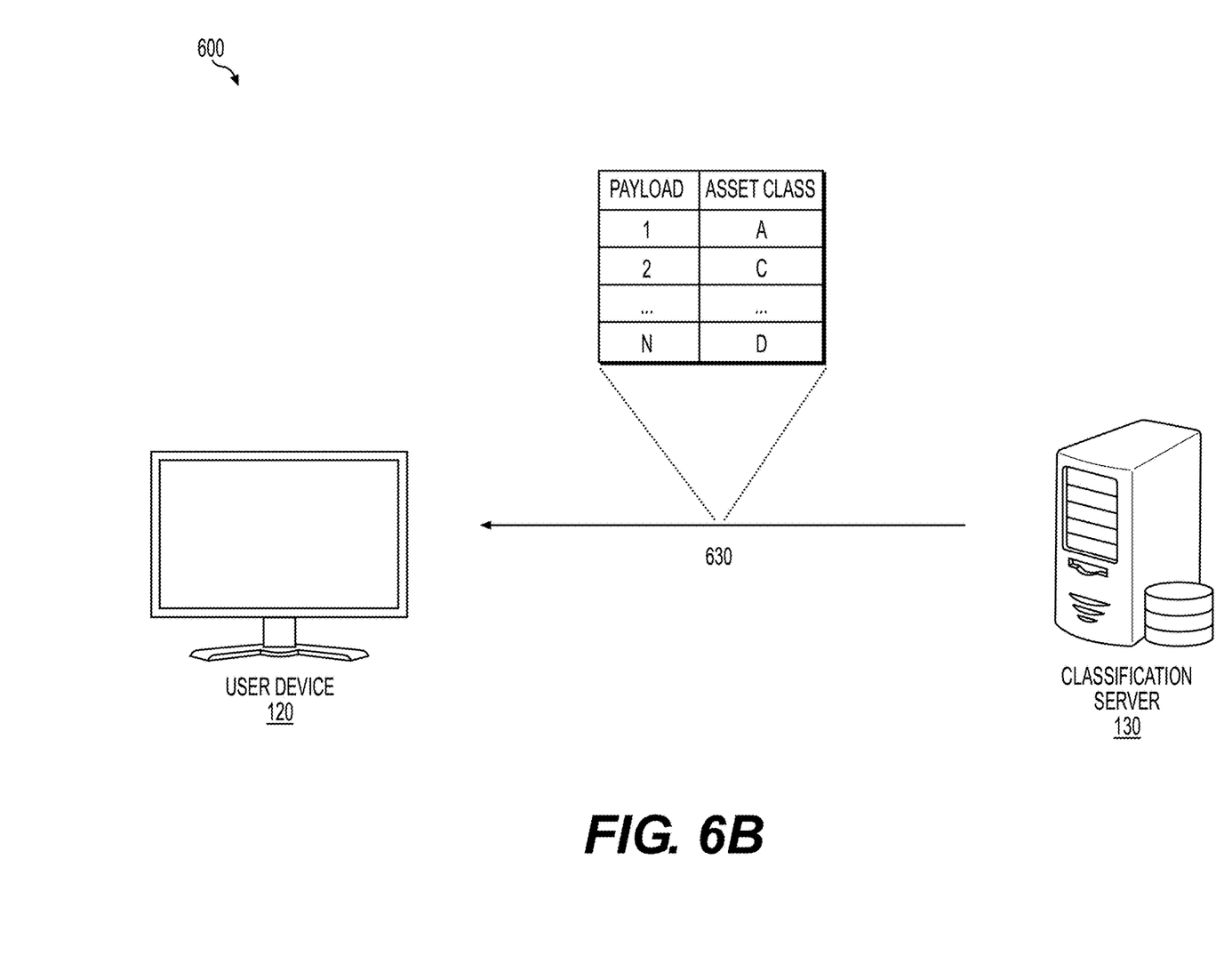

In some implementations, the user device 120 may receive the information identifying the asset class of the digital reality capture assets to which the set of source files are classified, and display the information identifying the asset class of the digital reality capture assets to which the set of source files are classified. In this way, an operator of the user device 120 may view the information identifying the asset class of the digital reality capture assets to which the set of source files are classified, and perform any modifications if needed. The user device 120 may provide feedback information to the classification server 130 based on any modifications, or lack of modifications, by an operator. In this way, the classification server 130 may train, or update, the classification model 135 based on the feedback information.

In some implementations, the user device 120 may receive the information identifying the asset class of the digital reality capture assets to which the set of source files are classified, and automatically modify the source files to include the information identifying the asset class of the digital reality capture assets to which the set of source files are classified. For example, the information identifying the asset class of the digital reality capture assets to which the set of source files are classified may include an instruction to automatically update the source files to include the information identifying the asset class of the digital reality capture assets to which the set of source files are classified.

The user device 120 may modify the source files to include the information identifying the asset class of the digital reality capture assets to which the set of source files are classified based on either an operator input or the automatic instruction from the classification server 130. The user device 120 may provide the source files to the database 145 for later usage.

Figure 6C:
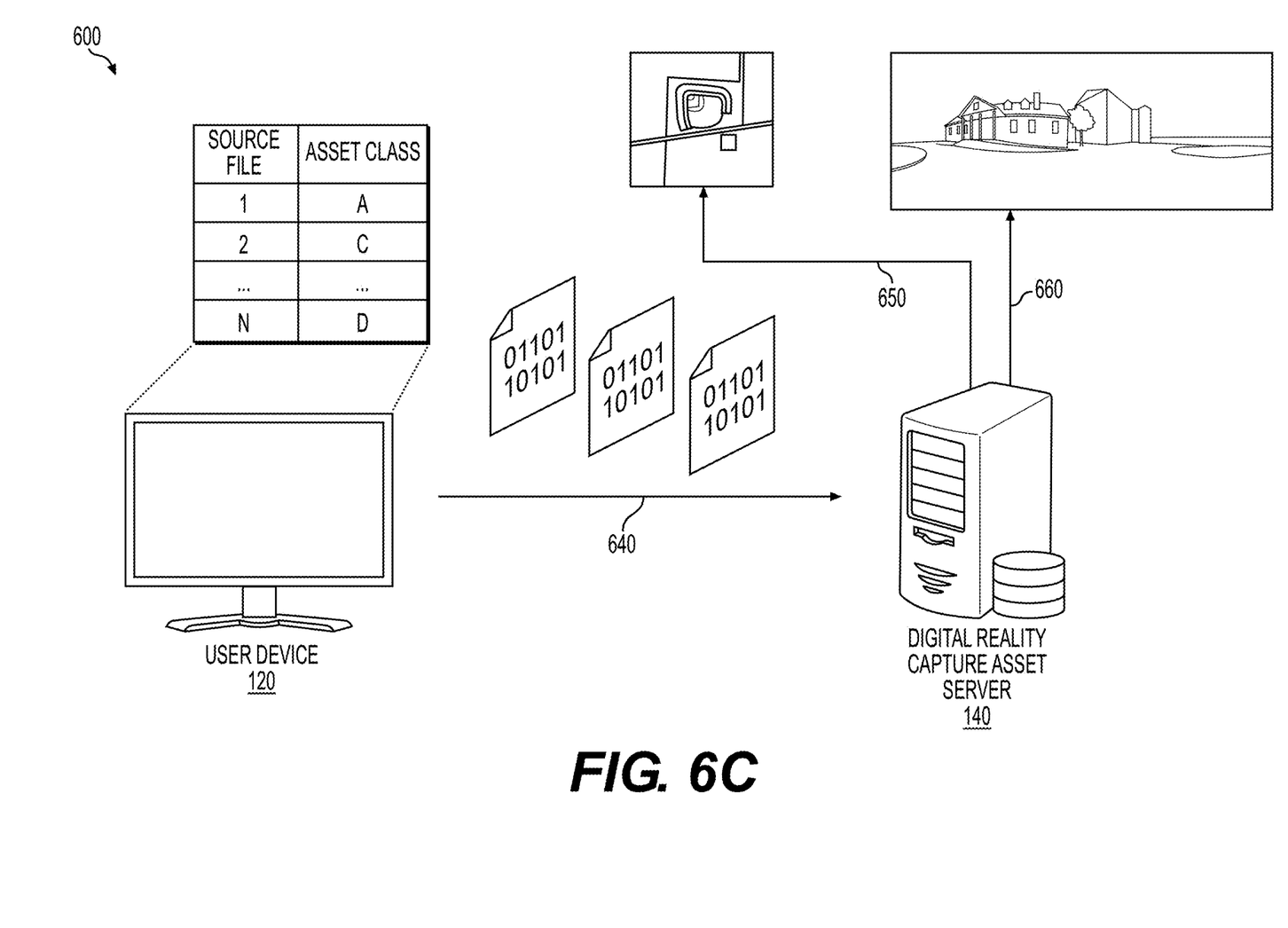

Alternatively, the user device 120 may provide the source files to the digital reality capture asset server 140. The digital reality capture asset server 140 may receive the source files, and generate a digital reality capture asset(s), corresponding to the classified asset class(es), of region(s) of interest. For example, as shown by reference number 640 of FIG. 6C, the user device 120 may provide source files to the digital reality capture asset server 140. As shown, the source files include information identifying the asset class of the digital reality capture assets to which the set of source files are classified. For instance, "source file 1" is classified into "asset class A," "source file 2" is classified into "asset class C," and "source file N" is classified into "asset class D." As shown by reference number 650, the digital reality capture asset server 140 may generate an orthomosaic based on source files classified as belonging to the asset class of "orthomosaic." As shown by reference number 660, the digital reality capture asset server 140 may generate a panorama based on source files classified as belonging to the asset class of "panorama."

In an alternative embodiment, the camera 110-1, the camera 110-2, and/or the camera 110-3 may generate source files corresponding to the reality capture data, and directly provide the source files to the classification server 130. For example, the camera 110-1, the camera 110-2, and/or the camera 110-3 may directly communicate with the classification server 130 via an API. Alternatively, the camera 110-1, the camera 110-2, and/or the camera 110-3 may generate a set of payloads based on the set of source files, and directly provide the set of payloads to the classification server 130.

The classification server 130 may receive the set of source files (or payloads) directly from the camera 110-1, the camera 110-2, and/or the camera 110-3, and may classify the set of source files of the reality capture data into an asset class of digital reality capture assets. In some cases, the classification server 130 may add metadata to the source files identifying the asset class to which the set of source files are classified.

Based on classifying the set of source files (or payloads) received directly from the camera 110-1, the camera 110-2, and/or the camera 110-3, the classification server 130 may provide information identifying the asset class to which the set of source file are classified to the user device 210. Alternatively, the classification server 130 may provide information identifying the asset class to which the set of source files are classified to the digital reality capture asset server 140. As yet another alternative, the classification server 130 may provide information identifying the asset class to which the set of source files are classified to the database 145.

In this way, the present disclosure provides methods and systems for automatically classifying source files of reality capture data into an asset class of digital reality capture assets. In this way, the present disclosure provides a technical improvement in classifying source files and generating corresponding digital reality capture assets by more accurately classifying source files, more efficiently classifying source files, and more quickly classifying source files. Moreover, the present disclosure provides methods and systems for classifying source files of reality capture data into an asset class of digital reality capture assets using metadata of the source files instead of the entirety of the source files. In this way, the present disclosure provides a technical improvement in classifying source files and generating corresponding digital reality capture assets by reducing an amount of data that is transmitted via a network, and by reducing the amount of data that is processed.

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description.

We claim:

1. A method comprising:
    receiving, by a user device, a set of source files of reality capture data corresponding to a region of interest captured by a camera;
    generating, by the user device, a set of payloads including metadata of the set of source files;
    providing, by the user device and to a server, the set of payloads to permit the server to classify the set of source files of the reality capture data into an asset class that identifies a type of digital reality capture asset to be generated based on the set of source files;
    receiving, by the user device and from the server, information identifying the asset class of the digital reality capture assets to which the set of source files are classified to permit a digital reality capture asset, corresponding to the asset class, of the region of interest to be generated based on the set of source files; and
    automatically updating, by the user device, the source files to include the information identifying the asset class of the digital reality capture assets to which the set of source files are classified.

2. The method of claim 1, wherein the set of payloads includes less data than the set of source files.

3. The method of claim 1, wherein the set of source files are generated by the camera of an unmanned aerial vehicle (UAV).

4. The method of claim 1, wherein the server is configured to cluster the set of payloads into a cluster based on the metadata.

5. The method of claim 1, wherein the metadata includes at least one of a latitude, a longitude, an altitude, a time stamp, an identifier of a camera, an identifier of an unmanned aerial vehicle, an identifier of a vehicle, a number of pixels, a pixel height, a pixel width, an aspect ratio, a file type, a flight identifier, a job identifier, a region of interest identifier, an entity identifier, an operator identifier, a user identifier, or a customer identifier.

6. The method of claim 1, wherein the asset class includes a panorama, a walkthrough, a progress photo, a progress video, a raw file, a pre-processed panorama, an orthomosaic, a thermal capture, a multi-spectral image, a slant range image, or a façade capture.

7. A user device comprising:
    a memory configured to store instructions; and
    one or more processors configured to execute the instructions to perform operations comprising:

receiving a set of source files of reality capture data corresponding to a region of interest captured by a camera;

generating a set of payloads including metadata of the set of source files;

providing, to a server, the set of payloads to permit the server to classify the set of source files of the reality capture data into an asset class that identifies a type of digital reality capture asset to be generated based on the set of source files;

receiving, from the server, information identifying the asset class of the digital reality capture assets to which the set of source files are classified to permit a digital reality capture asset, corresponding to the asset class, of the region of interest to be generated based on the set of source files; and automatically updating the source files to include the information identifying the asset class of the digital reality capture assets to which the set of source files are classified.

8. The user device of claim 7, wherein the set of payloads includes less data than the set of source files.

9. The user device of claim 7, wherein the set of source files are generated by the camera of an unmanned aerial vehicle (UAV).

10. The user device of claim 7, wherein the server is configured to cluster the set of payloads into a cluster based on the metadata.

11. The user device of claim 7, wherein the metadata includes at least one of a latitude, a longitude, an altitude, a time stamp, an identifier of a camera, an identifier of an unmanned aerial vehicle, an identifier of a vehicle, a number of pixels, a pixel height, a pixel width, an aspect ratio, a file type, a flight identifier, a job identifier, a region of interest identifier, an entity identifier, an operator identifier, a user identifier, or a customer identifier.

12. The user device of claim 7, wherein the asset class includes a panorama, a walkthrough, a progress photo, a progress video, a raw file, a pre-processed panorama, an orthomosaic, a thermal capture, a multi-spectral image, a slant range image, or a façade capture.

13. A non-transitory computer-readable medium storing instructions that, when executed by one or more processors of a user device, cause the one or more processors to perform operations comprising:

receiving a set of source files of reality capture data corresponding to a region of interest captured by a camera;

generating a set of payloads including metadata of the set of source files;

providing, to a server, the set of payloads to permit the server to classify the set of source files of the reality capture data into an asset class that identifies a type of digital reality capture asset to be generated based on the set of source files; and receiving, from the server, information identifying the asset class of the digital reality capture assets to which the set of source files are classified to permit a digital reality capture asset, corresponding to the asset class, of the region of interest to be generated based on the set of source files; and automatically updating the source files to include the information identifying the asset class of the digital reality capture assets to which the set of source files are classified.

14. The non-transitory computer-readable medium of claim 13, wherein the set of payloads includes less data than the set of source files.

15. The non-transitory computer-readable medium of claim 13, wherein the set of source files are generated by the camera of an unmanned aerial vehicle (UAV).

16. The non-transitory computer-readable medium of claim 13, wherein the server is configured to cluster the set of payloads into a cluster based on the metadata.

17. The non-transitory computer-readable medium of claim 13, wherein the metadata includes at least one of a latitude, a longitude, an altitude, a time stamp, an identifier of a camera, an identifier of an unmanned aerial vehicle, an identifier of a vehicle, a number of pixels, a pixel height, a pixel width, an aspect ratio, a file type, a flight identifier, a job identifier, a region of interest identifier, an entity identifier, an operator identifier, a user identifier, or a customer identifier.

* * * * *